United States Patent [19]
Anderson

[11] Patent Number: 5,770,082
[45] Date of Patent: Jun. 23, 1998

[54] SELF-PURGING EXTRACTOR

[75] Inventor: George E. Anderson, Champlin, Minn.

[73] Assignee: Crown Iron Works Company, Minneapolis, Minn.

[21] Appl. No.: 643,033

[22] Filed: May 2, 1996

[51] Int. Cl.$^6$ ........................................... B01D 11/00
[52] U.S. Cl. ..................... 210/634; 210/511; 422/268
[58] Field of Search ................ 99/516; 196/14.52; 208/390, 391, 428; 210/400, 401, 511, 634, 770; 422/261, 264, 268, 269

[56] References Cited

U.S. PATENT DOCUMENTS

| | | | |
|---|---|---|---|
| 275,989 | 4/1883 | Byerley . | |
| 307,707 | 11/1884 | Byerley | 210/400 |
| 2,684,288 | 7/1954 | De Smet | 422/268 |
| 2,733,136 | 1/1956 | Andrews | 422/268 |
| 3,856,474 | 12/1974 | Pittman et al. | 196/14.5 R |
| 4,224,138 | 9/1980 | Kruyer | 208/391 |
| 4,751,060 | 6/1988 | Kratochwill | 422/268 |
| 4,857,279 | 8/1989 | Kawamata et al. | 422/268 |

FOREIGN PATENT DOCUMENTS

| | | | |
|---|---|---|---|
| 1129800 | 8/1982 | Canada | 208/390 |

OTHER PUBLICATIONS

Brochure by De Smet Group entitled "Solvent•Extraction•Systems" (not dated).
"De•Smet Extractor Type 'L–M'" Specification (not dated).
"De Smet brings you new . . . ", Oil Mill Gazetteer, Dec. 1980.
Brochure "Solvent Extraction" by De Smet Engineering (not dated).

*Primary Examiner*—Joseph W. Drodge
*Attorney, Agent, or Firm*—Nawrocki, Rooney & Sivertson, P.A.

[57] ABSTRACT

An improved longitudinal extractor utilizing a solvent for removing an entrained liquid from a carrier medium. The improved extractor includes a sprocket driven continuous chain-link conveyor mounted both in cooperation with an upper carrier medium chamber and a lower liquid collection chamber. The chain link conveyor has an upper run which moves the carrier medium past sparging solvent nozzles and a lower run which cleans the collection chamber by continuously scraping the bottom of the collection chamber free of sedimentation and hazardous build-up. The carrier medium is supported on a plurality of spaced-apart longitudinal members which allow the miscible fluid resulting from percolation removal to flow therebetween into the collection chamber. A plurality of spaced-apart collectors are arranged along the bottom of the collection chamber to provide for continuous removal of the miscible fluid from the collection chamber.

20 Claims, 2 Drawing Sheets

SELF-PURGING EXTRACTOR

BACKGROUND OF THE INVENTION

1. Field of the Invention

This invention relates generally to a system for extracting an entrained liquid from a solid carrier medium through use of a liquid solvent; and, more particularly relates to an extractor mechanism that utilizes a sprocket-driven continuous chain-link conveyor to both move the solid carrier medium past sparging solvent nozzles and to contact the bottom of a collection chamber to direct the miscible fluid and any contamination or hazardous materials into spaced-apart collectors.

2. State of the Prior Art

It has been recognized that various industrial applications exist for separation of liquid substances entrained within carrier solids. Common examples include removal and recovery of oils from oil seeds, cereals and meals.

It has also been recognized that the nature of the carrier material affects the process or processes necessary to be utilized to extract the desired entrained liquids. In the case of ground oil seeds from which a desired oil is to be extracted, it can be seen that the carrier medium, that is the oil seeds, is quite often homogeneous, and can quite easily be processed to a relatively fine granularity. In this instance the distribution of the entrained oil can be considered to be quite consistent throughout the bulk of the carrier medium.

For certain meals, however, the nature of the carrier material varies. The carrier material is often not as evenly sized as the usual oil seeds, with the size of the agglomerations varying significantly.

Percolation removal of entrained liquids involves applying an appropriate solvent to the carrier material such that the solvent flows (percolates) through the material, loosening and combining with the entrained liquid as it passes through. Percolation works well to remove entrained liquids from carriers that are quite regular in granularity and having the entrained liquid relatively evenly dispersed throughout.

When the meals with less evenly sized solids carrier material are used, much of the current practice fails to recognize or deal with the hazards of collection of portions of the carrier material that may pass through the screens or which may enter the liquid collection chambers below or enter the chain return path below by adhering to the chain conveyors. This collection of carrier material soaked in the miscible fluid made up of the solvent and released liquid results in a flammable deposit that can be very hazardous if not handled properly.

To address the deficiencies in the prior art, this invention was developed to provide an improved self-purging extractor for use in removing entrained liquids from solid carrier material through the use of solvents applied to the carrier material. An upper portion of an improved sprocket-driven chain linked assembly is utilized to move the solvent-soaked material along a support bed. A lower portion of the chain linked assembly is utilized to collect the miscible fluid and to purge a collection chamber of hazardous materials. These and other more detailed and specific objectives of the invention will become apparent to those skilled in the art from a consideration of the drawings and the description of the preferred embodiment.

SUMMARY OF THE INVENTION

The present invention comprises a self-purging extraction system for use in extracting entrained liquids from an associated solid carrier material. It includes an elongated housing having an upper material treatment chamber, and a lower miscible fluid collection chamber. A miscible fluid is developed when a liquid solvent is passed through the solid carrier material, and the solvent loosens the entrained liquid and combines with it.

A material supporting structure is supported within the housing intermediate the upper and lower chambers. The supporting structure is comprised of a plurality of spaced apart elongated members mounted to the housing structure along its length. The spaced apart members are separated a sufficient distance to substantially inhibit passage of the supported material therebetween, while allowing the miscible fluid to pass through into the collection chamber.

A sprocket-driven, chain-linked conveyor assembly is situated with an upper run in contact with the material supporting structure, and is adapted to move the solid carrier material along the length of the housing. As the material is moved along, a suitable solvent is applied in sufficient volume to cause the removal of the entrained liquid. The entrained liquid and the solvent form the miscible fluid that passes into the collection chamber between the plurality of spaced apart members.

A lower run of the chain-linked conveyor assembly returns in contact with the lower surface of the collection chamber to move any material residue having fallen through the material supporting structure into a plurality of spaced apart collectors for removal from the extractor system, along with the miscible fluid, to a pump system that reintroduces the mixture back above the carrier bed to one or more sprinkler heads to thereafter be recaptured in the stream of carrier material. The action of the chain-linked conveyor and pump system thereby purges the system of any residue and hazardous materials.

The solvent is applied to the carrier material through a plurality of application mechanisms spaced apart in the upper material chamber along the length of the housing. Solvent applicators are also provided at selected locations within the collection chamber and to the collectors to allow assistance in removal of the collected miscible fluid and any carrier material residue and hazardous materials from the system.

The improved chain-linked conveyor includes a plurality of sections made up of transverse material-moving webs and spaced apart link members holding the moving webs in fixed relationship to each other. Pinned roller assemblies interconnect conveyor sections, and are adapted to cooperate with associated drive sprockets to impart motion to the conveyor system. The transverse material-moving webs have a height sufficient to move a predetermined quantity of the carrier material, and at least as high as the link members, so that when a link passes into the collection chamber, the outer edges of the webs will come in contact with the surface of the bottom of the collection chamber to scrape along its length.

The present invention is thus an improved self-purging extractor apparatus for use extracting entrained liquids from a solid granular carrier material. Additional features of the invention and the advantages derived therefrom, and the various scopes and aspects of the invention will become apparent from the drawings, the description of the preferred embodiment of the invention, and the claims.

DETAILED DESCRIPTION OF THE INVENTION

Figure 1:
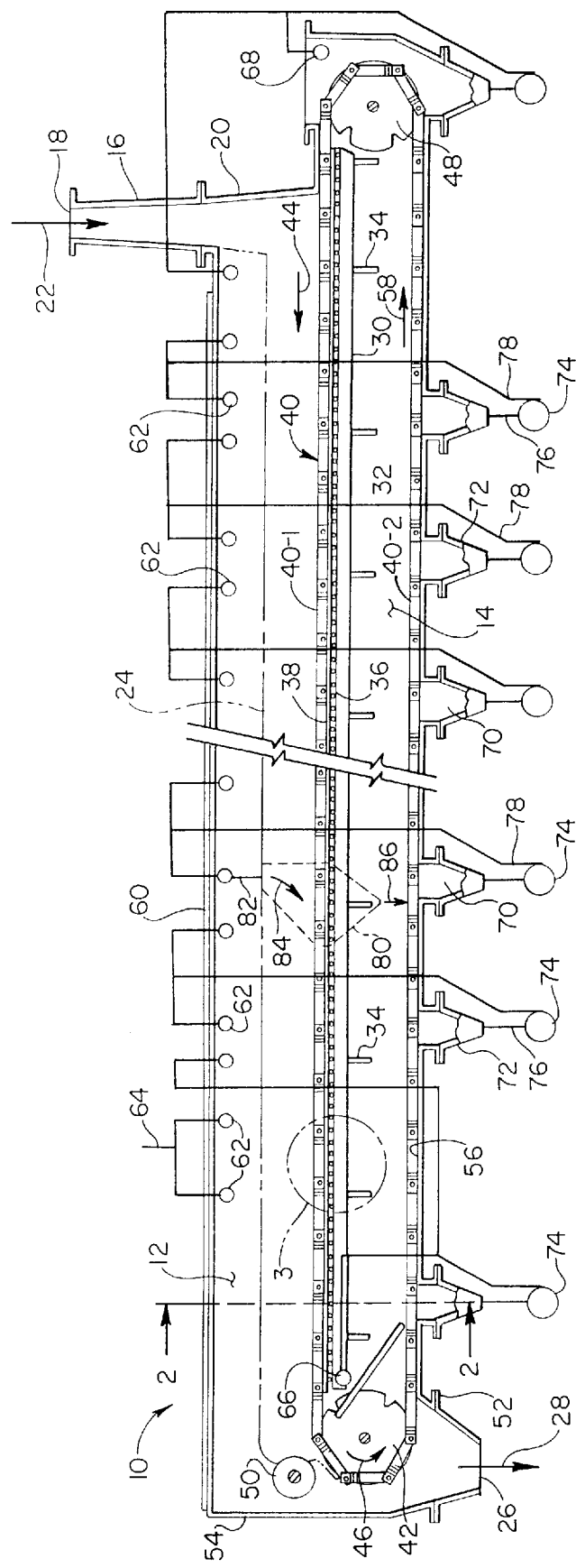
FIG. 1 is a simplified elevation view, with parts cut away, of the improved self-purging extractor of the present invention.

When referring to the drawings, like reference numerals will denote like elements throughout the various views.

FIG. 1 is simplified elevation view, with parts cut away, of the improved self-purging extractor of the present invention. An elongated housing 10 has an upper material handling chamber 12 and a lower collection chamber 14. A material receiving structure 16 has input aperture 18, and is mounted at receiving end 20 of housing 10. Carrier material is loaded through aperture 18 in the direction of arrow 22 to a predetermined material level 24. The carrier material is loaded by conventional means (not shown) such an auger system, a conveyor system, a gravity feed, or other suitable loading means that allows control of the application and rate of flow of the carrier material to the extractor system.

The housing 10 has a treated material output aperture 26 that discharges treated material in the direction of arrow 28 to a discharge system (not shown).

The upper material treatment chamber 12 and the lower collection chamber 14 are separated by support structure 30 which includes a plurality of spaced apart major longitudinal members 32 and a plurality of spaced apart major transverse members 34 affixed beneath major longitudinal members 32. A plurality of spaced apart transverse diamond bar members 36 are positioned at the tops and along the lengths of major longitudinal members 32 and are affixed thereto. A plurality of spaced apart triangular material supporting members 38 extending along the length of support structure 30 are affixed to the tops of transverse diamond bar members 36. The details of this structure 30 will be described in more detail with respect to FIG. 3 below.

A closed loop chain-linked conveyor 40 cooperates with drive sprockets 42 to move carrier material in the direction of arrow 44, with drive sprockets 42 being rotated by a drive mechanism (not shown) in the rotary direction of arrow 46. The upper run 40-1 is supported on and slidably engages the upper surfaces of triangular members 38. Idler sprockets 48 are rotatably supported at material input end 20 of housing 10. The drive sprockets 42 and the idler sprockets 48 are spaced apart transversely and are adapted to engage roller connections on conveyor 40, as will be shown in more detail below.

A roller 50 is oriented transverse to housing 10 and in a selected proximity to drive sprocket 42, such that treated material is forced therebetween to limit movement of the carrier material along the length of chamber 12, and reduce it to small clumps which will not plug the discharge conveyors below the output aperture 26. A transverse baffle 52 is mounted in operational proximity to drive sprocket 42, in a manner to inhibit treated material from being able to be transported into the collection chamber 14. Baffle 52 is also utilized to divert miscible fluid percolating at the discharge end 54 into the collection chamber 14 and away from discharge aperture 26.

The lower run 40-2 of conveyor 40 has its outer edges in contact with the upper surface of bottom 56 of the collection chamber 14. Movement of lower portion 40-2 in the direction of arrow 58 causes bottom 56 to be continuously scraped clean of debris and residue, including any hazardous deposits.

Housing 10 has an upper cover 60 that is selectively removable to expose the extractor mechanisms. A plurality of transverse solvent dispensing devices 62 are spaced apart along the length of housing 10 and receive solvent provided at solvent input duct 64. Dispensing devices 62 are adapted to provide selected levels of solvent across the length of conveyor 40 and are spaced apart longitudinally in housing 10 to provide predetermined quantities of solvent to the carrier material as the material moves in the direction of arrow 44. Solvent dispensed by devices 62 also cascades downwardly through spaces between longitudinal members 32 of support structure 30. Such cascading solvent serves to effectively wash any carrier material which might be adhered to web sections (such as 118, 120) of the lower run 40-2 of conveyor 40 as lower run 40-2 passes in a direction to the right, as viewed in FIG. 1.

A transverse solvent source 66 is positioned in proximity to drive sprocket 42 and baffle 52 to allow solvent to be applied thereto for cleaning purposes. Another transverse solvent source 68 is positioned in proximity to idler sprocket 48 to allow application of solvent in the area for cleaning and prevention of clogging.

Bottom 56 of collection chamber 14 has a plurality of spaced apart collection apertures 70, each in cooperation with an associated hopper 72 arranged to deliver miscible fluid into an associated collector 74 via a conduit 76. Solvent is made available to each collector via solvent line 78.

In order that the carrier material be partially restrained in moving toward discharge end, and to facilitate drainage of the miscible fluid into collectors 74, discharge end 54 of housing 10 is slightly elevated over input end 20. The angle of elevation in this embodiment is approximately at a one degree slope.

The profile of the application of the solvent to the carrier material being treated is illustratively shown within dashed enclosure 80. Solvent 82 is applied from source 62 across the width of the conveyor 40. The solvent saturates the carrier material and percolates downward. With the conveyor actuated, the portion of the material obstructing upper conveyor run 40-1 will be pulled in the direction of discharge end 54. The deeper the carrier material, the less the movement near the upper level. This provides for percolation that tends to progress in the direction of arrow 84. At the point of contact of the carrier material with upper portion of the support structure 30, the miscible fluid will flow between the triangular members 38 and will pass in the direction of arrow 86 into the collection chamber 14. The miscible fluid, containing solvent having passed through the carrier material, will cascade through the collection chamber 14 and engage web sections (such as at 118, 120) to efficiently wash them of carrier material which may have become caked thereon. The cascading miscible fluid will also efficiently wash surface 56 defining the bottom of collection chamber 14.

Figure 2:
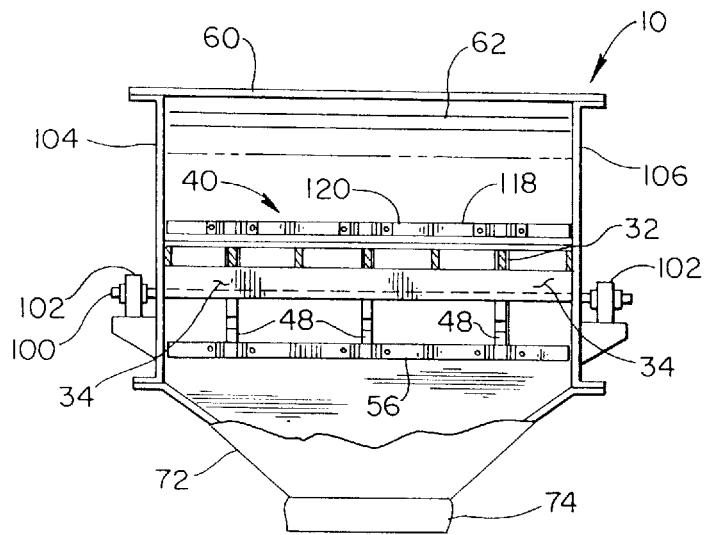
FIG. 2 is a simplified transverse section view taken along line 2—2 in FIG. 1.

FIG. 2 is a simplified transverse section view taken along line 2—2 in FIG. 1. It illustrates that the spaced apart idler sprockets 48 are mounted via axle 100 and pillow blocks 102 that in turn are supported by opposed housing sides 104 and 106. Hopper 72 is shown with slanted portions directing fluid flow toward collector 74.

Figure 3:
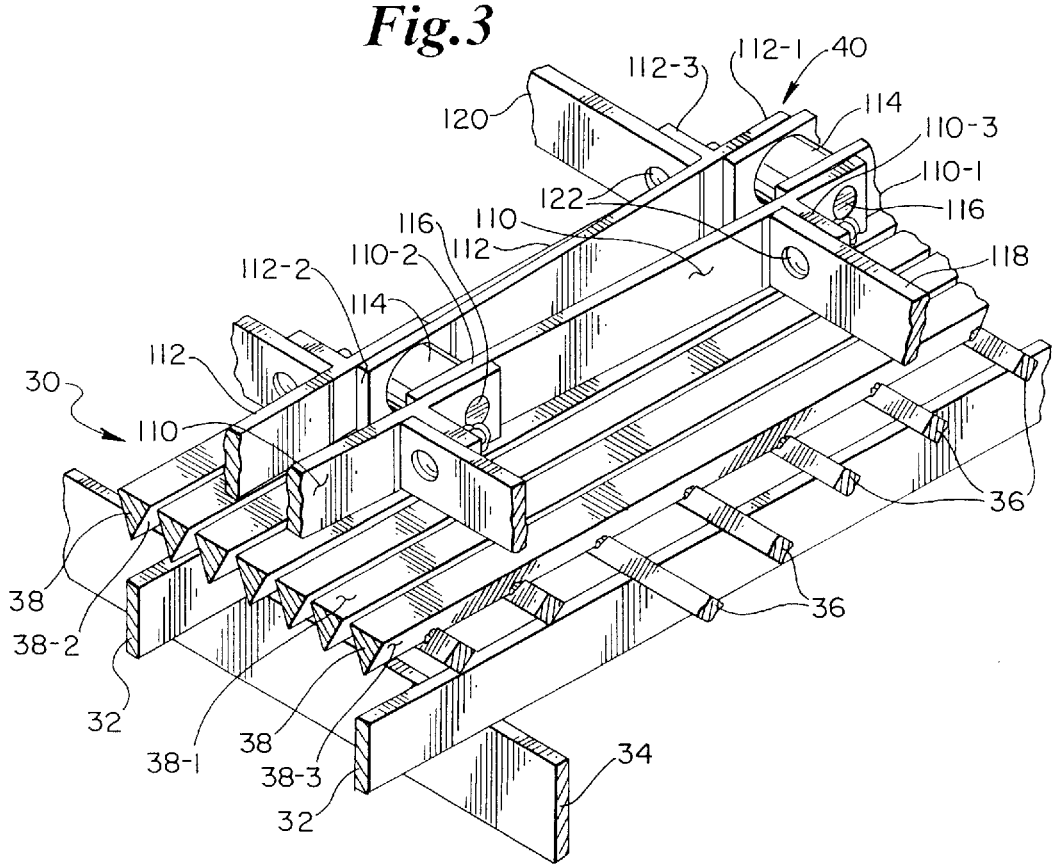
FIG. 3 is an enlarged perspective detail view of a portion of the conveyor assembly taken from the area encircled at 3 in FIG. 1.

FIG. 3 is an enlarged perspective detail view taken from the encircled area 3 in FIG. 1. This illustrates in more detail the construction of support structure 30 and chain-linked conveyor 40. The main longitudinal support members 32 are substantially rectangular in cross-section and are positioned vertically on, and at right angles to, the main transverse support members 34. The transverse diamond bar members 36 are spaced apart and affixed, as by welding, to the upper edges of the main longitudinal support members 32. The longitudinal triangular members 38 are closely spaced with the inverted apex portions affixed to the transverse diamond bar members 36 and the upper surfaces 38-1 are substantially coplanar. The spacing 38-2 between adjacent triangular members 38 is selected according to the nature of the carrier material granularity and the nature of the miscible fluid. It is desirable that as little carrier material as possible pass through spacing 38-2, while allowing the miscible fluid to readily flow therebetween. The sloping sides 38-2 of triangular members 38 form a widening channel that tends to avoid clogging within spacing 38-2 by carrier residue that might pass therethrough.

The chain-linked conveyor 40 is made up of a plurality of link sections where adjacent links 110 and 112 have outer link ends 110-1 and 112-1, respectively, and inner link ends 110-2 and 112-2, respectively. The outer link ends 110-1 and 112-1 enclose the associated inner link ends 110-2 and 112-2 and an associated roller 114, and are rotatably held in place by link pins 116. Outer link ends 110-1 and 112-1 have web connectors 110-3 and 112-3, respectively, to couple web sections 118 and 120, respectively, by web bolts 122. It is of course understood from FIG. 1 that there are a plurality of web sections such as sections 118 and 120 extending transversely across the width of housing 10. In operation, while the conveyor 40 is moved longitudinally along the support structure 30, the web members cause a longitudinal wiping of surfaces 38-1.

In operation, one embodiment of the invention can be utilized to extract oil from soybeans. When the soybeans have been prepared by flaking, approximately two hundred tons per day can be treated. Soybeans characteristically have oil entrained at about twenty percent by weight. The solvent Hexane, available commercially, can be utilized to release the entrained oil. It is of course understood that the overall length of the housing 10, the length of the carrier material support 30, the slope of the extractor device, the depth of the carrier material, and the amount and placement of the solvent will all affect the efficiency and effectiveness of the extraction process. Further, it is understood that the dimensions of the webs 120 will affect the movement of the carrier material and the effectiveness of the purging action.

It can be seen from the foregoing description of the preferred embodiment and the operation thereof that the objectives of providing an improved self-purging extractor mechanism for extracting entrained liquids from carrier material has been achieved. The system allows reliable and efficient gathering of the extracted liquids, while avoiding build-up of sedimentation or hazardous materials in the chain return 40-2 and collection chamber.

Numerous characteristics and advantages of the invention have been set forth. It is understood that the description of the preferred embodiment is, in many respects, only illustrative. Changes may be made in details, particularly in matters of shape, size, and arrangement of parts without exceeding the scope of the invention. Having described the preferred embodiment in conjunction with the drawings, it can be seen that the various purposes and objectives have been achieved, and that there are modifications and extensions that will become apparent to those skilled in the art without exceeding the spirit and scope of the invention. Accordingly, what is intended to be protected by Letters Patent is set forth in the appended Claims.

What is claimed is:

1. For use in processing a solid carrier material to remove an entrained liquid by-product, an improved extractor comprising:

housing means for use in processing carrier material to release entrained liquid, said housing means including a material handling chamber means for enclosing the carrier material and including collection chamber means for collecting extracted liquid;

support means separating said material handling chamber means and said collection chamber means for supporting the carrier material and for allowing extracted liquid to pass into said collection chamber means;

solvent application means for applying solvent to the carrier material in a manner to cause the entrained liquid to be substantially released from the carrier material;

conveyor means having a first portion in a first relationship to said support means for causing movement of the carrier material in said material handling chamber means and having a second portion in contact with said chamber means for wiping a portion of said collection chamber means; and motive means coupled to said conveyor means for causing movement of said conveyor means, whereby solvent applied to the carrier material causes release and separation of the entrained liquid and passage from said material handling chamber means into said collection chamber means while self-purging said collection chamber means.

2. An extractor as in claim 1, wherein said solvent application means includes a plurality of solvent dispensing means arranged in spaced apart locations in said material handling chamber means for applying solvent to the carrier material at a plurality of locations as it is moved along by said conveyor means to enhance the extraction of the entrained liquid.

3. An extractor as in claim 2, wherein said support means includes a plurality of elongated triangular cross-section support rod means having corresponding surfaces which are coplanar with adjacent of said corresponding surfaces spaced from each other for allowing extracted liquid to pass therebetween while supporting the carrier material on said corresponding surfaces.

4. An extractor as in claim 3, wherein said conveyor means includes a plurality of web means each having a first surface for contacting said corresponding surfaces, a second surface for imparting movement to the carrier material, and a third surface for contacting said portion of said collection chamber means;

linkage means for interconnecting said plurality of web means; and roller means rotatably coupled to said linkage means for interacting with said motive means.

5. An extractor as in claim 4, wherein said motive means includes sprocket means for engaging said roller means for imparting movement to said linkage means and to said plurality of web means.

6. An extractor as in claim 5, wherein said housing means includes an input end having input means for injecting carrier material into said material handling chamber means, said input end having a first elevation; and an output end having output means for removing processed carrier material from said material handling chamber means, said output end having a second elevation higher than said first elevation.

7. An extractor as in claim 1, wherein said collection chamber means further includes a plurality of spaced apart apertures; and collector means in cooperation with said plurality of spaced apart apertures for collecting the extracted liquid.

8. A method of extracting entrained liquid from a solid carrier material comprising the steps of:

loading carrier material containing entrained liquid into an extraction chamber;

applying sufficient solvent to said carrier material to cause release and separation of the entrained liquid as flowing liquid;

passing said flowing liquid into collection chamber means and over a return run of a conveyor passing through the collection chamber means;

continuously wiping at least a portion of the collection chamber means by contacting the collection chamber means with the conveyor return run to remove sedimentation and to prevent build-up of any hazardous materials within the collection chamber means; and recovering said flowing liquid.

9. The method of claim 8, and further including the step of moving the carrier material while said step of applying sufficient solvent is being executed.

10. The method of claim 9, wherein said step of applying sufficient solvent includes saturating the carrier material with solvent at separate locations as the carrier material is moved.

11. The method of claim 10, wherein said recovering step includes collecting the extracted liquid at multiple selected locations in the collection chamber means.

12. For use in processing a solid carrier material to remove an entrained liquid by-product, an improved extractor, comprising:

an elongated housing having a material handling chamber and collection chamber means;

a support structure mounted within said elongated housing between said material handling chamber and said collection chamber means, said support structure having material support surfaces to support carrier material and a plurality of liquid passages to pass liquid into said collection chamber means;

a conveyor assembly having a first portion in a first carrier material moving relationship to said material support surface and a second portion having a second purging relationship to a portion of said collection chamber means said second portion begin in contact with said chamber means;

solvent applicators mounted in said material handling chamber to apply solvent to the carrier material; and a drive mechanism coupled to move said conveyor assembly, whereby solvent applied to the carrier material causes release of the entrained liquid and passage of the released liquid from said material handling chamber into said collection chamber means while self-purging said collection chamber means.

13. An extractor as in claim 12, wherein said solvent applicators include a plurality of solvent dispensing structures in spaced apart positions along said elongated housing in said material handling chamber to apply solvent to the carrier material at a plurality of locations as it is moved along by said conveyor assembly to thereby enhance extraction of the entrained liquid.

14. An extractor as in claim 13, wherein said support structure includes a plurality of elongated triangular cross-section support rod means having corresponding surfaces which are coplanar with adjacent of said corresponding surfaces spaced from each other for allowing extracted liquid to pass therebetween while supporting the carrier material on said corresponding surfaces.

15. An extractor as in claim 14, wherein said support structure further includes a plurality of transverse, diamond-shaped cross-section rods spaced from one another to support said elongated triangular cross-section support rod means.

16. An extractor as in claim 14, wherein said conveyor assembly includes a plurality of web members transversely arranged, each having a first surface to contact said corresponding surfaces, a second surface to impart movement to the carrier material, and a third surface to contact said portion of said collection chamber means;

a link structure interconnecting said plurality of web members; and a plurality of rollers rotatably coupled to said link structure.

17. An extractor as in claim 16, wherein said drive mechanism includes at least one drive sprocket to engage said plurality of rollers;

at least one idler sprocket to engage said plurality of rollers; and said first portion of said conveyor assembly and said second portion of said conveyor assembly are substantially oppositely disposed.

18. An extractor as in claim 17, wherein said elongated housing includes an input end having a material input structure to load carrier material into said material handling chamber, said input end having a first elevation;

an output end having an output structure to eject processed carrier material, said output end having a second elevation higher than said first elevation; and a baffle transversely positioned in a predetermined relationship with said output structure.

19. An extractor as in claim 18, wherein said collection chamber means further includes a plurality of spaced apart apertures; and a plurality of collectors coupled to respectively associated ones of said plurality of spaced apart apertures to collect extracted liquid that passes into said collection chamber means.

20. For use in processing a solid carrier material to remove an entrained liquid by-product, an improved extractor comprising:

an elongated housing having an input end with an input structure to load carrier material, an output end higher than said input end, said output end having an output structure to remove processed carrier material, a material handling chamber, and collection chamber means;

a support structure mounted within said elongated housing between said material handling chamber and said collection chamber means, said support structure having major transverse support members, major longitudinal support members supported by said major transverse support members, a plurality of transverse, diamond-shaped cross-section support members affixed to said major longitudinal support members, and a plurality of triangular cross-section support rods having corresponding surfaces which are coplanar with adjacent of said corresponding surfaces spaced from each other to allow extracted liquid to pass therethrough while supporting the carrier material on the corresponding surfaces;

a plurality of solvent dispensing structures in spaced apart positions along said elongated housing in said material handling chamber to apply solvent to the carrier material at a plurality of locations to thereby enhance extraction of the entrained liquid;

a conveyor assembly having a first portion supported by said support structure and a second opposed portion in contact with a portion of said collection chamber means, said conveyor assembly including a plurality of web members transversely arranged, each having a first surface to contact said corresponding surfaces, a second surface to impart movement to the carrier material, and a third surface to contact said portion of said collection chamber means, a link structure interconnecting said plurality of web members, and a plurality of rollers rotatably coupled to said link structure;

a drive sprocket assembly to engage said plurality of rollers;

an idler sprocket assembly to engage said plurality of rollers;

a baffle transversely positioned in a predetermined relation to said output structure;

a plurality of apertures in said collection chamber means; and a plurality of collector structures coupled to respectively associated ones of said plurality of spaced apart apertures to collect extracted liquid that passes into said collection chamber means.

* * * * *